United States Patent
Höglund et al.

(10) Patent No.: US 11,589,201 B2
(45) Date of Patent: Feb. 21, 2023

(54) NETWORK NODE, USER EQUIPMENT (UE) AND METHODS FOR HANDLING COMMUNICATION IN A NARROWBAND INTERNET OF THINGS (NB-IOT) OR MACHINE TYPE COMMUNICATION (MTC) NETWORK

(71) Applicant: TELEFONAKTIEBOLAGET LM ERICSSON (PUBL), Stockholm (SE)

(72) Inventors: Andreas Höglund, Solna (SE); Antti Ratilainen, Espoo (FI); Emre Yavuz, Stockholm (SE); Tuomas Tirronen, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/650,960

(22) PCT Filed: Aug. 31, 2018

(86) PCT No.: PCT/SE2018/050873
§ 371 (c)(1),
(2) Date: Mar. 26, 2020

(87) PCT Pub. No.: WO2019/074418
PCT Pub. Date: Apr. 18, 2019

(65) Prior Publication Data
US 2020/0351633 A1    Nov. 5, 2020

Related U.S. Application Data

(60) Provisional application No. 62/570,128, filed on Oct. 10, 2017.

(51) Int. Cl.
H04W 4/00        (2018.01)
H04H 20/71      (2008.01)
(Continued)

(52) U.S. Cl.
CPC .......... *H04W 4/70* (2018.02); *G06F 9/45558* (2013.01); *H04W 76/14* (2018.02); *H04W 76/27* (2018.02);
(Continued)

(58) Field of Classification Search
CPC ....... H04W 4/70; H04W 76/30; H04W 76/14; H04W 76/27; H04W 48/12; G06F 9/45558; G06F 2009/45595
(Continued)

(56) References Cited

U.S. PATENT DOCUMENTS

2012/0039171 A1* 2/2012 Yamada .................. H04L 47/12
370/232
2012/0176975 A1* 7/2012 Choi ...................... H04W 48/12
370/329
(Continued)

FOREIGN PATENT DOCUMENTS

WO    2015043779 A1    4/2015
WO    2016095820 A1    6/2016
(Continued)

OTHER PUBLICATIONS

ISR from corresponding application PCT/SE2018/050873.

*Primary Examiner* — Mark G. Pannell
(74) *Attorney, Agent, or Firm* — Sage Patent Group

(57) ABSTRACT

Some embodiments herein disclose a network node (QQ160) for handling communication in a narrowband internet of things network or a machine type communication network. The network node is configured to transmit an indication to a user equipment, UE, (QQ110) while the UE (QQ110) is in a connected mode or is released from the connected mode, wherein the indication indicates an update of at least a part of a system information, SI, of a service area
(Continued)

of the narrowband internet of things network or the machine type communication network.

12 Claims, 14 Drawing Sheets

(51) Int. Cl.
    *H04W 4/70*     (2018.01)
    *H04W 76/30*     (2018.01)
    *H04W 76/14*     (2018.01)
    *H04W 76/27*     (2018.01)
    *G06F 9/455*     (2018.01)

(52) U.S. Cl.
    CPC ... *H04W 76/30* (2018.02); *G06F 2009/45595* (2013.01)

(58) Field of Classification Search
    USPC .......................................................... 370/329
    See application file for complete search history.

(56) References Cited

U.S. PATENT DOCUMENTS

| | | | |
|---|---|---|---|
| 2012/0282965 A1* | 11/2012 | Kim | H04W 48/06 455/515 |
| 2013/0039309 A1* | 2/2013 | Chiu | H04W 48/08 370/329 |
| 2013/0115913 A1* | 5/2013 | Lin | H04L 47/122 455/410 |
| 2014/0198685 A1 | 7/2014 | Hao | |
| 2016/0219495 A1* | 7/2016 | Martin | H04W 72/005 |
| 2016/0227472 A1 | 8/2016 | Tao | |
| 2017/0013391 A1* | 1/2017 | Rico Alvarino | H04W 68/005 |
| 2017/0374491 A1* | 12/2017 | Xiao | H04W 4/70 |

FOREIGN PATENT DOCUMENTS

| | | |
|---|---|---|
| WO | 2016163127 A1 | 10/2016 |
| WO | 2018174600 A1 | 9/2018 |

* cited by examiner

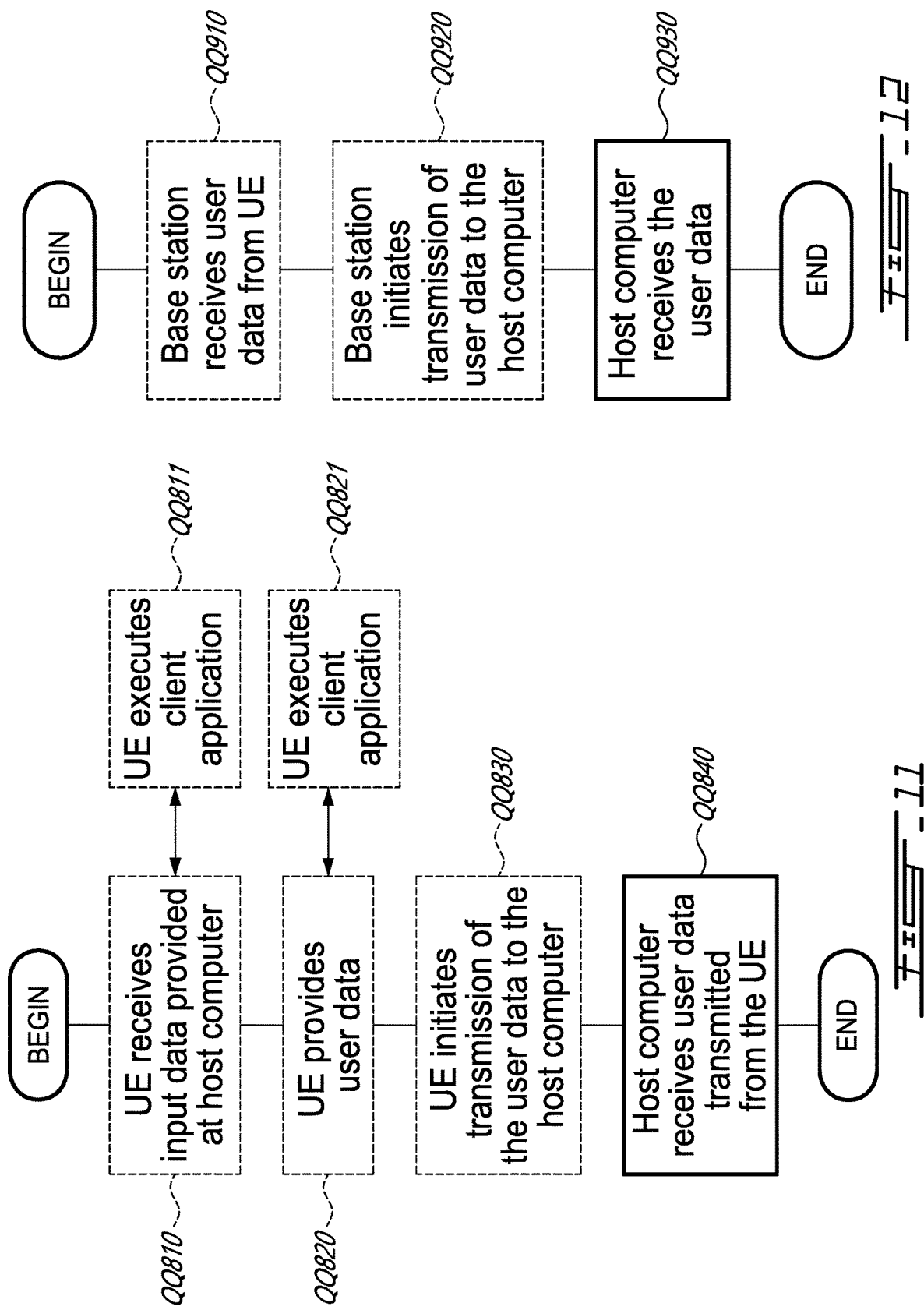

NETWORK NODE, USER EQUIPMENT (UE) AND METHODS FOR HANDLING COMMUNICATION IN A NARROWBAND INTERNET OF THINGS (NB-IOT) OR MACHINE TYPE COMMUNICATION (MTC) NETWORK

TECHNICAL FIELD

Embodiments herein relate to a network node, a user equipment (UE) and methods performed therein. In particular embodiments herein relate to handling communication in a narrowband Internet of Things network or machine type communication network.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

There has been a lot of work in 3GPP lately on specifying technologies to cover Machine-to-Machine (M2M) and/or Internet of Things (IoT) related use cases. Most recent work for 3GPP Release 13 and 14 includes enhancements to support Machine-Type Communications (MTC) with new UE categories (Cat-M1, Cat-M2), supporting reduced bandwidth of up to 6 physical resource blocks (PRBs), and Narrowband IoT (NB-IoT) UEs providing a new radio interface (and UE categories, Cat-NB1 and Cat-NB2).

We will refer to the LTE enhancements introduced in 3GPP Release 13, 14 and 15 for MTC as enhanced MTC "eMTC", including (not limiting) support for bandwidth limited UEs, Cat-M1, and support for coverage enhancements. This is to separate discussion from NB-IoT (notation here used for any Release), although the supported features are similar on a general level.

There are multiple differences between regular LTE and the procedures and channels defined for eMTC (likewise for NB-IoT). Some important differences include new physical channels, such as the physical downlink control channels, called MTC Physical Downlink Control Channel (MPDCCH) in eMTC and Narrowband Physical Downlink Control Channel (NPDCCH) in NB-IoT, and a new physical random access channel, Narrowband physical random access channel (NPRACH), for NB-IoT. For system information, SI, (both eMTC and NB-IoT) there is no dynamic scheduling of either SIB1-Bandwidth Reduced (BR)/SIB1-NB (scheduling information included in MIB/MIB-NB), or system information messages (fixed scheduling inside system information window provided in SIB1-BR/SIB1-NB). Both eMTC and NB-IoT support coverage enhancements and the UE may have to accumulate several repetitions of system information broadcast in order to be able to successfully decode it. This means that system information acquisition time will in practice be longer the worse coverage the UE is in. In order to combat this, more dense repetitions for some physical channels and system information was introduced in eMTC and NB-IoT Release 13. The drawback of this is an increase in system overhead, i.e. more radio resources are consumed by continuous ("always-on") control signaling broadcast. The system acquisition procedure is in general the same for eMTC and NB-IoT as for LTE; The UE first achieves downlink synchronization by reading Primary Synchronization Signal (PSS) and/or Secondary Synchronization signals (SSS), then it reads Master Information Block (MIB), then System Information Block 1 (SIB1), and last the SI-messages are acquired (each possibly containing multiple SIBs).

For eMTC and NB-IoT UEs, the system information (SI) is considered to be invalid 24 hours after it was successfully considered to be valid. For "normal" UEs the system information is considered to be invalid after 3 hours. It is also possible to configure eMTC to use the 3 hours validity range by using parameter si-ValidityTime [TS 36.331].

During Release 14 some problems related to long system information acquisition time were identified by working group RAN4. Reducing the system acquisition time is also one of the agreed work item objectives for Release 15, which is common to both eMTC and NB-IoT:

Improved latency:
  Reduced system acquisition time [RAN1 lead, RAN2, RAN4]
    Improved cell search and/or system information (including MIB and SIB1-BR) acquisition performance
  Reduced system acquisition time [RAN1 lead, RAN2, RAN4]
    Improved cell search and/or system information (at least MIB-NB) acquisition performance, for all operation modes This is a fairly broad Work Item (WI)-objective description and any improvement for reducing to time spent to read SI, and hence reducing UE power consumption, can be included in this WI-objective, e.g., reduced acquisition time upon system information update.

System information change can be indicated to UEs by using Paging message, according to TS 36.331 v.13.0.0 section 5.2.1.3:

When the network changes (some of the) system information, it first notifies the UEs about this change, i.e. this may be done throughout a modification period. In the next modification period, the network transmits the updated system information. These general principles are illustrated in figure 5.2.1.3-1, in which different colours indicate different system information. Upon receiving a change notification, the UE not configured to use a DRX cycle that is longer than the modification period acquires the new system information immediately from the start of the next modification period. Upon receiving a change notification applicable to eDRX, a UE in RRC_IDLE configured to use a DRX cycle that is longer than the modification period acquires the updated system information immediately from the start of the next eDRX acquisition period. The UE applies the previously acquired system information until the UE acquires the new system information. The possible boundaries of modification for SystemInformationBlockType1-BR are defined by SFN values for which SFN mod 512=0 except for notification of ETWS/CMAS for which the eNB may change SystemInformationBlockType1-BR content at any time. For NB-IoT, the possible boundaries of modification for SystemInformationBlockType1-NB are defined by SFN values for which (H-SFN*1024+SFN) mod 4096=0.

The Paging message is used to inform UEs in RRC_IDLE and UEs in RRC_CONNECTED about a system information change. If the UE is in RRC_CONNECTED or is not configured to use a DRX cycle longer than the modification period in RRC_IDLE, and receives a Paging message including the systemInfoModification, it knows that the system information will change at the next modification period boundary. A UE in RRC_IDLE that is configured to use a DRX cycle longer than the modification period, and receives in an eDRX acquisition period at least one Paging message including the systemInfoModification-eDRX, shall acquire the updated system information at the next eDRX acquisition period boundary. Although the UE may be informed about changes in system information, no further details are provided e.g. regarding which system information will change, except if systemInfoValueTagSI is received by BL UEs or UEs in CE.

However, unlike for legacy LTE, eMTC and NB-IoT UEs do not have to monitor for SI change in RRC Connected:

In RRC_CONNECTED, BL UEs or UEs in CE or NB-IoT UEs are not required to acquire system information except when T311 is running or upon handover where the UE is only required to acquire the MasterInformationBlock in the target PCell. In RRC_IDLE, E-UTRAN may notify BL UEs or UEs in CE or NB-IoT UEs about SI update, and except for NB-IoT, ETWS and CMAS notification and EAB modification, using Direct Indication information, as specified in 6.6 (or 6.7.5 in NB-IoT) and TS 36.212 [22]. It should be noted that upon system information change for BL UEs, UEs in CE, or NB-IoT UEs in RRC_CONNECTED, E-UTRAN may initiate connection release.

Thus, UEs may not have the latest SI resulting in a reduced or limited performance in the wireless network.

SUMMARY

There currently exist one or more challenge(s). The fact that UEs of MTC and NB-IoT are not required to monitor for system information updates in RRC Connected mode causes problems. This is because, after a UE is released to RRC Idle mode, the UE is unaware of if there has been any change in system information and must therefore re-acquire at least parts of the system information to be sure.

Certain aspects of the present disclosure disclose embodiments herein that provide solutions to these or other challenges. According to an aspect some embodiments herein provide a method performed by a network node for handling communication in a narrowband internet of things network or a machine type communication network. The network node, e.g. eNB or a core network node, transmits an indication to a UE while the UE is in a connected mode or is released from the connected mode. The indication indicates an update of at least a part of a system information (SI) of a service area of the narrowband internet of things network or the machine type communication network.

According to another aspect embodiments herein provide a method performed by a UE for handling communication in a narrowband internet of things network or a machine type communication network. The UE receives, when being in a connected mode or during a release of the UE from the connected mode, an indication from a network node, wherein the indication indicates an update of at least a part of a SI of a service area in the narrowband internet of things network or the machine type communication network.

According to yet another aspect embodiments herein provide a network node for handling communication in a narrowband internet of things network or a machine type communication network. The network node is configured to transmit an indication to a UE while the UE is in a connected mode or is released from the connected mode. The indication indicates an update of at least a part of a SI of a service area of the narrowband internet of things network or the machine type communication network.

According to yet another aspect embodiments herein provide a UE for handling communication in a narrowband internet of things network or a machine type communication network. The UE is configured to receive, when the UE is in a connected mode or during a release of the UE from the connected mode, an indication from a network node, wherein the indication indicates an update of at least a part of a SI of a service area in the narrowband internet of things network or the machine type communication network.

In brief, embodiments herein may introduce signaling to either:
A. Inform UEs in active or connected mode, such as RRC_CONNECTED mode, about SI update.
B. Inform UEs upon released to inactive or idle mode, such as RRC_IDLE mode, about whether SI has been updated or not during the connected period.

Embodiments herein relate to, for limited bandwidth UEs such as eMTC and NB-IoT UEs, introducing signaling to indicate whether (when) at least a part of the system information has(is) been updated while the UE has been in connected mode such as RRC_CONNECTED mode. This removes the need for unnecessary subsequent SI acquisition to ensure system information has not been updated, which will have a positive impact on UE power consumption and battery life.

Thus, embodiments herein reduce the system acquisition time for UEs and therefore extend UE battery life.

BRIEF DESCRIPTION OF THE DRAWINGS

Embodiments will now be described in more detail in relation to the enclosed drawings, in which:

FIG. 11 shows methods implemented in a communication system including a host computer, a base station and a user equipment in accordance with some embodiments.

FIG. 12 shows methods implemented in a communication system including a host computer, a base station and a user equipment in accordance with some embodiments.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Due to reduced UE complexity, UES with limited complexity such as eMTC and NB-IoT UEs are from Rel-13 not obliged to monitor SI change notifications in paging in RRC_CONNECTED mode. It is therefore, as mentioned in the background section, either up to the UE to determine whether SI has been updated or up the eNB to release the UE to RRC_IDLE before SI is updated. The latter is not a very nice solution since it interrupts all UEs that are currently in RRC_CONNECTED mode and wastes both radio and UE resources since the UEs must once again go through the RRC connection establishment procedure to finish their data transmissions. For the first case, if the connected session was not longer than a Broadcast control Channel (BCCH) modification period or not crossing a BCCH modification period boundary, it is sufficient if the UE re-acquires MIB-NB (for NB-IoT) or SIB1-BR (for eMTC) to check if the system value Tag has been updated. If the connected session was longer than a BCCH modification period or crossing a BCCH modification period boundary, the UE would have to re-acquire all system information.

Embodiments herein introduce signaling from a network node QQ160 to a UE QQ110 while in e.g. RRC_CONNECTED mode or while being released from e.g. RRC_CONNECTED mode to avoid having to re-acquire SI in this way.

Figure 1:
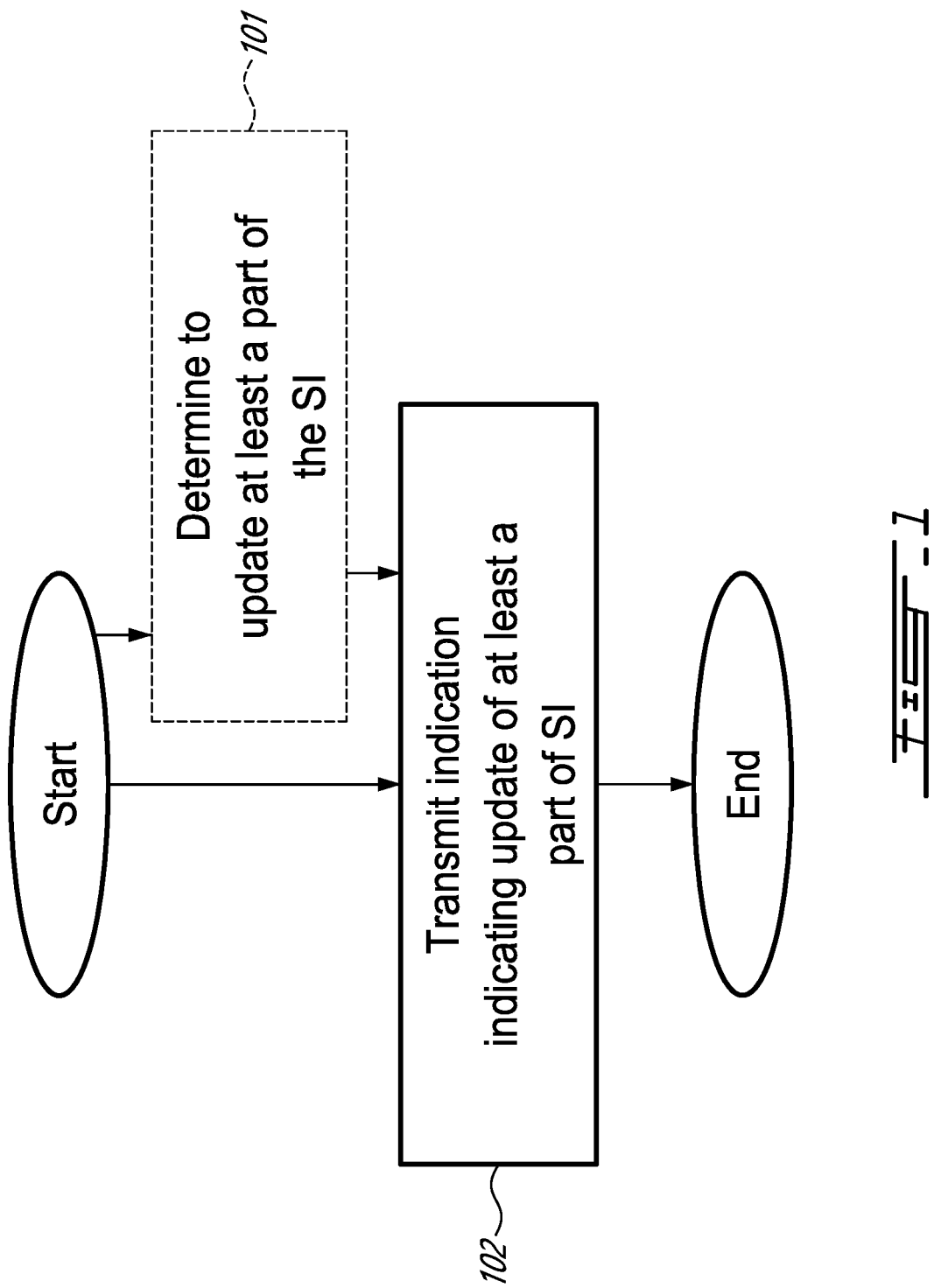
FIG. 1: shows a flowchart of a method performed by a network node in an NB-IoT or MTC network in accordance with embodiments herein.

It is herein provided a method performed by the network node QQ160 for handling communication in a narrowband internet of things network or a machine type communication network as shown in FIG. 1. The actions do not have to be taken in the order stated below, but may be taken in any suitable order. Actions performed in some embodiments are marked with dashed boxes.

Action 101. The network node QQ160 may determine to update the at least part of a SI for the service area of the narrowband internet of things network or the machine type communication network or that an update of the at least part of the SI has occurred or not while the UE has been connected.

Action 102. The network node QQ160 transmits an indication to the UE 10, while the UE 10 is in a connected mode or is released from the connected mode, wherein the indication indicates an update of at least a part of the SI of a service area of the narrowband internet of things network or the machine type communication network. The indication may indicate what SI has been updated and/or indicate whether an update of the at least part of the SI has occurred or not. The indication may be provided as provided part(s) of the SI that has changed or indicating which part(s) that have been updated. The indication may be transmitted to inform the UE 10 upon being released from connected mode to idle mode about whether the at least part of the SI has been updated or not during the connected mode. The network node may further provide the at least part(s) of the SI that has changed, e.g. appending a SIB.

The network node QQ160 may thus inform UEs in RRC_CONNECTED mode about SI update. In this embodiment, the network node QQ160, such as the eNB, will upon SI update notify also the enhanced coverage UEs or bandwidth reduced low complexity UEs, such as eMTC and NB-IoT UEs, about the SI update. The new signaling for the purpose of SI change notification, i.e. corresponding to systemInfoModification, for UEs in connected mode may be any combination of the following:

Dedicated RRC signaling.
Indication in Downlink Control Information (DCI), i.e. on NPDCCH or MPDCCH.
Appended to Radio Link Control (RLC) signaling, e.g. in RLC status report
Appended to Media Access Control (MAC) signaling, e.g. in MAC control element or Logical Channel ID (LCID).
Non Access Stratum (NAS) signaling, i.e. core network signaling
For any of the above the indication could be and one or more of the following:
  Pointing out that there has been a SI update, e.g. using a flag (one bit) indicating an update or not.
  Pointing out which part(s) of the SI that has changed, e.g. a SI-message.
  Providing the part(s) of the SI that has changed, e.g. appending a SIB.

The network node QQ160 may alternatively or additionally inform UEs upon released to RRC_I DLE mode about whether SI has been updated or not during the connected period. The network node QQ160 may thus upon release of the eMTC or NB-IoT UE to RRC_IDLE mode indicate to the UE QQ110 whether or not there has been any SI update during the UE's connected session. The new signaling for this indication may be any one or more of the following:

Indication in RRCConnectionRelease message. E.g. any of the following:
  E.g. a 1 bit flag is set if there has been one or more SI updates since the UE's Msg4, RRC Connection Setup/RRC Connection Resume. See non-exclusive example of the implementation of this option in TS 36.331 below for RRCConnectionRelease-NB message below.
  Provides gain when there is no SI update. In the rare event that there has been a SI update, the UE QQ110 still has to re-acquire SI in Idle as before.
System valueTag signaled upon RRC Connection release, e.g. in RRCConnectionRelease message.
Providing the part(s) of the SI that has changed, e.g. appending a SIB, in RRCConnectionRelease message.
In DCI indication RRC connection release
  This would be addition to what currently proposed for 'Fast RRC Release' WI-objective.

If the connected session has been longer than the BCCH modification period, there is risk of valueTag wrap-around and the valueTag would not be sufficiently:
Binary indication or even pointing out the SI-message that has changed.
Appended to RLC signaling, e.g. in RLC status report
Appended to MAC signaling, e.g. in MAC control element or LCID.
NAS signaling
For any of the above the indication may be:
- A flag indicating that there has been a SI update
- An indication of which part(s) of the SI that has changed (e.g. a SI-message)
- The system valueTag, e.g. the value at the time of the connection release.
- An indication of which part(s) of the SI that has changed (e.g. appending a SIB).

An RRCConnectionRelease-NB message may be used to command the release of an RRC connection (added as bold and underlined below).

Signalling radio bearer: SRB1 or SRB1bis
RLC-SAP: Acknowledged mode (AM)
Logical channel: Downlink Control Channel (DCCH)
Direction: E-UTRAN to UE RRCConnectionRelease-NB Message

```
-- ASN1START
RRCConnectionRelease-NB ::=                SEQUENCE {
    rrc-TransactionIdentifier                  RRC-TransactionIdentifier,
    criticalExtensions                         CHOICE {
        c1                                         CHOICE {
            rrcConnectionRelease-r13                   RRCConnectionRelease-NB-r13-IEs,
            spare1 NULL
        },
        criticalExtensionsFuture                   SEQUENCE { }
    }
}
RRCConnectionRelease-NB-r13-IEs ::=         SEQUENCE {
    releaseCause-r13                            ReleaseCause-NB-r13,
    resumeIdentity-r13                          ResumeIdentity-r13
        OPTIONAL, -- Need OR
    extendedWaitTime-r13                        INTEGER (1..1800)
        OPTIONAL, -- Need ON
    redirectedCarrierInfo-r13                   RedirectedCarrierInfo-NB-r13           OPTIONAL, -- Need ON
    lateNonCriticalExtension                    OCTET STRING                          OPTIONAL,
    nonCriticalExtension                        RRCConnectionRelease-NB-v1430-IEs     OPTIONAL
}
RRCConnectionRelease-NB-v1430-IEs ::=       SEQUENCE {
    redirectedCarrierInfo-v1430                 RedirectedCarrierInfo-NB-v1430
        OPTIONAL, -- Cond Redirection
    extendedWaitTime-CPdata-r14                 INTEGER (1..1800)     OPTIONAL,    -- Cond NoExtendedWaitTime
    nonCriticalExtension                        RRCConnectionRelease-NB-vXYZ-IEs      OPTIONAL
}
RRCConnectionRelease-NB-vXYZ-IEs ::=        SEQUENCE {
    systemInfoModification                      BOOLEAN
}
ReleaseCause-NB-r13 ::=                     ENUMERATED {loadBalancingTAUrequired, other,
                                                        rrc-Suspend, spare1}
RedirectedCarrierInfo-NB-r13::=             CarrierFreq-NB-r13
RedirectedCarrierInfo-NB-v1430 ::=          SEQUENCE {
    redirectedCarrierOffsetDedicated-r14        ENUMERATED{
                                                    dB1, dB2, dB3, dB4, dB5, dB6, dB8, dB10,
                                                    dB12, dB14, dB16, dB18, dB20, dB22,
                                                    dB24, dB26},
    t322-r14                                    ENUMERATED{
                                                    min5, min10, min20, min30, min60,
                                                    min120, min180,
                                                    spare1}
}
-- ASN1STOP
```

RRCConnectionRelease-NB field descriptions extendedWaitTime
Value in seconds.
extendedWaitTime-CPdata
Wait time for data transfer using the Control Plane CIoT EPS optimisation. Value in seconds. See TS 24.301 [35].
redirectedCarrierInfo
The redirectedCarrierInfo indicates a carrier frequency (downlink for FDD) and is used to redirect the UE to a NB-IoT carrier frequency, by means of the cell selection upon leaving RRC_CONNECTED as specified in TS 36.304 [4].
redirectedCarrierOffsetDedicated
Parameter "Qoffsetdedicated$_{frequency}$" in TS 36.304 [4]. For NB-IoT carrier frequencies, a UE that supports multi-band

| RRCConnectionRelease-NB field descriptions |
| --- |
| cells considers the redirectedCarrierOffsetDedicated to be common for all overlapping bands (i.e. regardless of the EARFCN that is used).
releaseCause
The releaseCause is used to indicate the reason for releasing the RRC Connection.
E-UTRAN should not set the releaseCause to loadBalancingTAURequired if the extendedWaitTime is present.
t322
Timer T322 as described in section 7.3. Value minN corresponds to N minutes.
systemInfoModification
Value TRUE indicates that system information has been modified and that the UE shall acquire MasterInformationBlock-NB, SystemInformationBlockType1-NB and modified SI messages upon leaving RRC CONNECTED. Value FALSE indicates that the UE does not need to acquire MasterInformationBlock-NB, SystemInformationBlockType1-NB, or any of the SI messages upon leaving RRC CONNECTED. |

| Conditional presence | Explanation |
| --- | --- |
| NoExtendedWaitTime | The field is optionally present, need ON, if the extendedWaitTime is not included; otherwise the field is not present. |
| Redirection | The field is optionally present, need ON, if redirectedCarrierInfo is included; otherwise the field is not present. |

Figure 2:
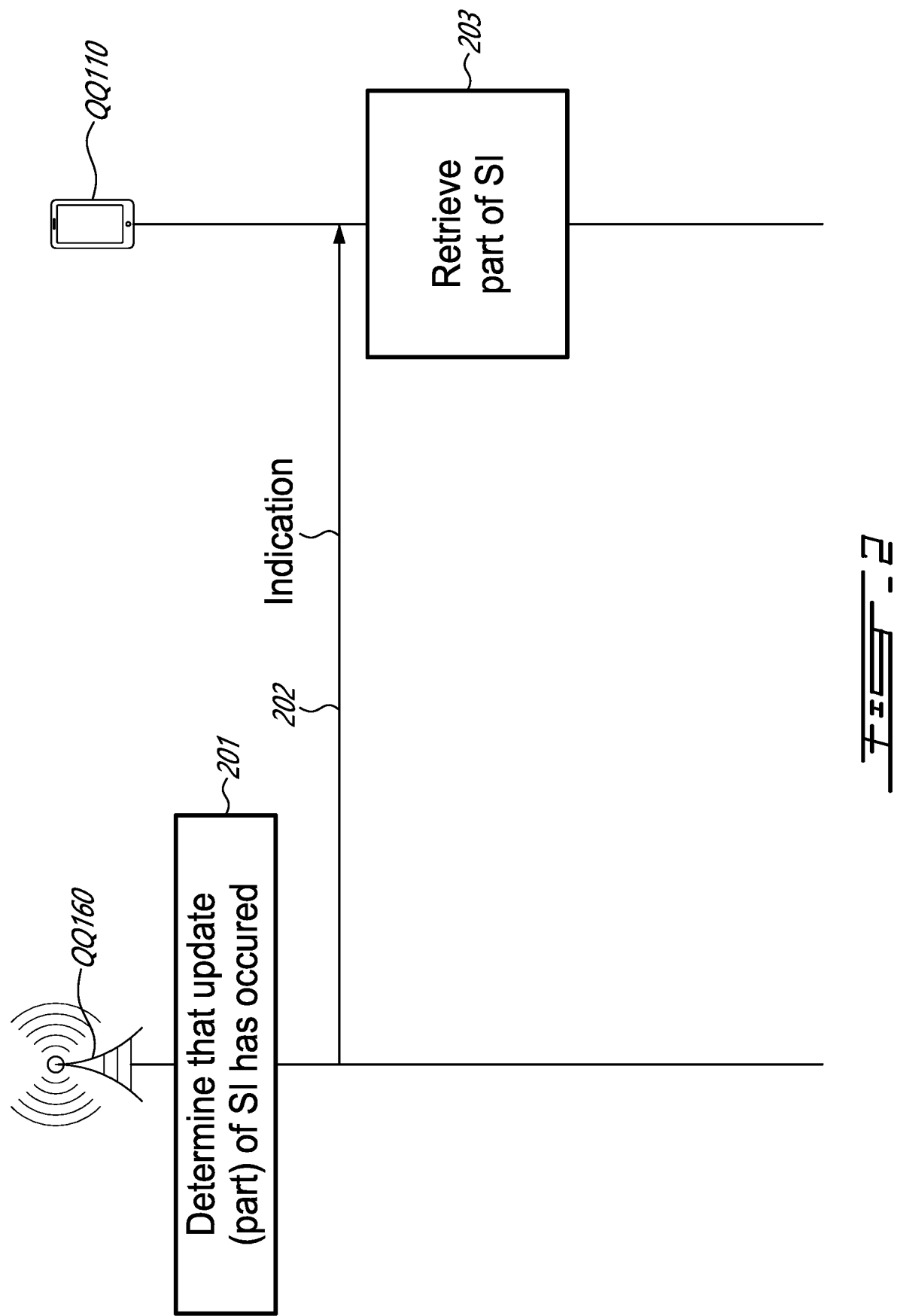
FIG. 2: shows a combined flowchart and signalling scheme in accordance with embodiments herein.

FIG. 2 is a combined signaling scheme and flow chart according to embodiments herein.

Action 201. The network node QQ160, such as a radio access network node or a core network node, may determine that an update of at least part of the SI for a service area of the network has occurred.

Action 202. The network node QQ160 transmits an indication to a UE being in connected mode or while being released from connected mode, which indication indicates that the at least part of system information of the service area of the network node has been updated.

Action 203. The UE QQ110 may then in case there has been an update retrieve the updated at least part of the SI. For example, in case indicated that part of SI has been updated the UE QQ110 may acquire MasterInformationBlock-NB, SystemInformationBlockType1-NB and modified SI messages upon leaving RRC_CONNECTED mode. In case indicated that part of SI has not been updated this indicates that the UE QQ110 does not need to acquire MasterInformationBlock-NB, SystemInformationBlock-Type1-NB, or any of the SI messages upon leaving RRC_CONNECTED mode.

There are, thus proposed herein, various embodiments which address one or more of the issues disclosed herein. According to an aspect a method is herein provided and performed by a network node such as an eNB for handling communication in a wireless network. The network node transmits an indication to a UE being in connected mode or while being released from connected mode, which indication indicates an update of at least part of system information of a service area of the wireless network, e.g. the indication may indicate whether an update of at least part of the SI has occurred or not and/or indicate which SI information has been updated. According to another aspect a method is herein provided performed by a UE, such as a low complexity and/or bandwidth reduced UE, for handling communication in a wireless network. The UE receives an indication, while being in connected mode or while being released from connected mode, from a network node, which indication indicates an update of at least part of system information of a service area of the wireless network e.g. whether an update of at least part of the SI has occurred or not and/or indicate which SI information has been updated. According to embodiments herein a network node and a user equipment is also herein provided to perform the methods herein and embodiments herein reduce the system acquisition time for UEs and therefore extend UE battery life.

Figure 3:
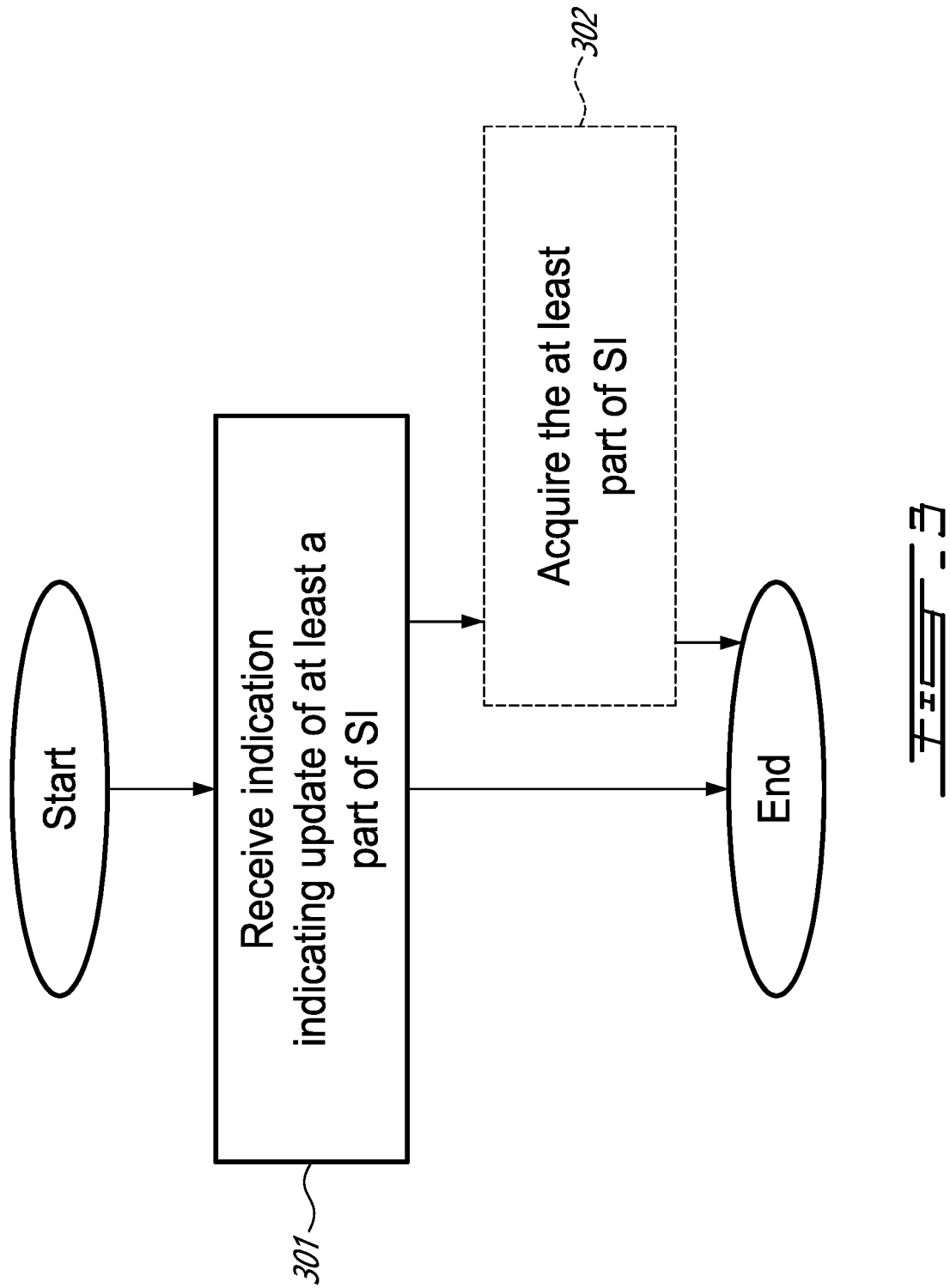
FIG. 3: shows a flowchart of a method performed by a UE in an NB-IoT or MTC network in accordance with embodiments herein.

The method actions performed by the UE QQ110 for handling communication in a narrowband internet of things network or a machine type communication according to embodiments herein will now be described with reference to a flowchart depicted in FIG. 3. The actions do not have to be taken in the order stated below, but may be taken in any suitable order. Actions performed in some embodiments are marked with dashed boxes. The UE QQ110 is in a connected mode or during a release of the UE QQ110 from the connected mode.

Action 301. The UE QQ110 receives the indication from the network node QQ160, wherein the indication indicates the update of at least a part of a SI of the service area in the narrowband internet of things network or the machine type communication network. The indication may indicate what SI has been updated, is the provided part of the SI that has changed, or indicates whether an update of the at least part of the SI has occurred or not. The indication may be received at the UE QQ110 during a release of the UE QQ110 from the connected mode to idle mode, and wherein the indication may indicate whether the at least part of the SI has been updated or not during the connected mode.

Action 302. The UE QQ110 may, when indication indicates what SI has been updated or that the update has occurred, retrieve the updated at least part of the SI. The UE QQ110 may acquire the part in Idle mode or similar. The UE QQ110 may, wherein the indication indicates that the at least part of the SI has been updated, retrieve the updated at least part of the SI in idle mode.

Figure 4:
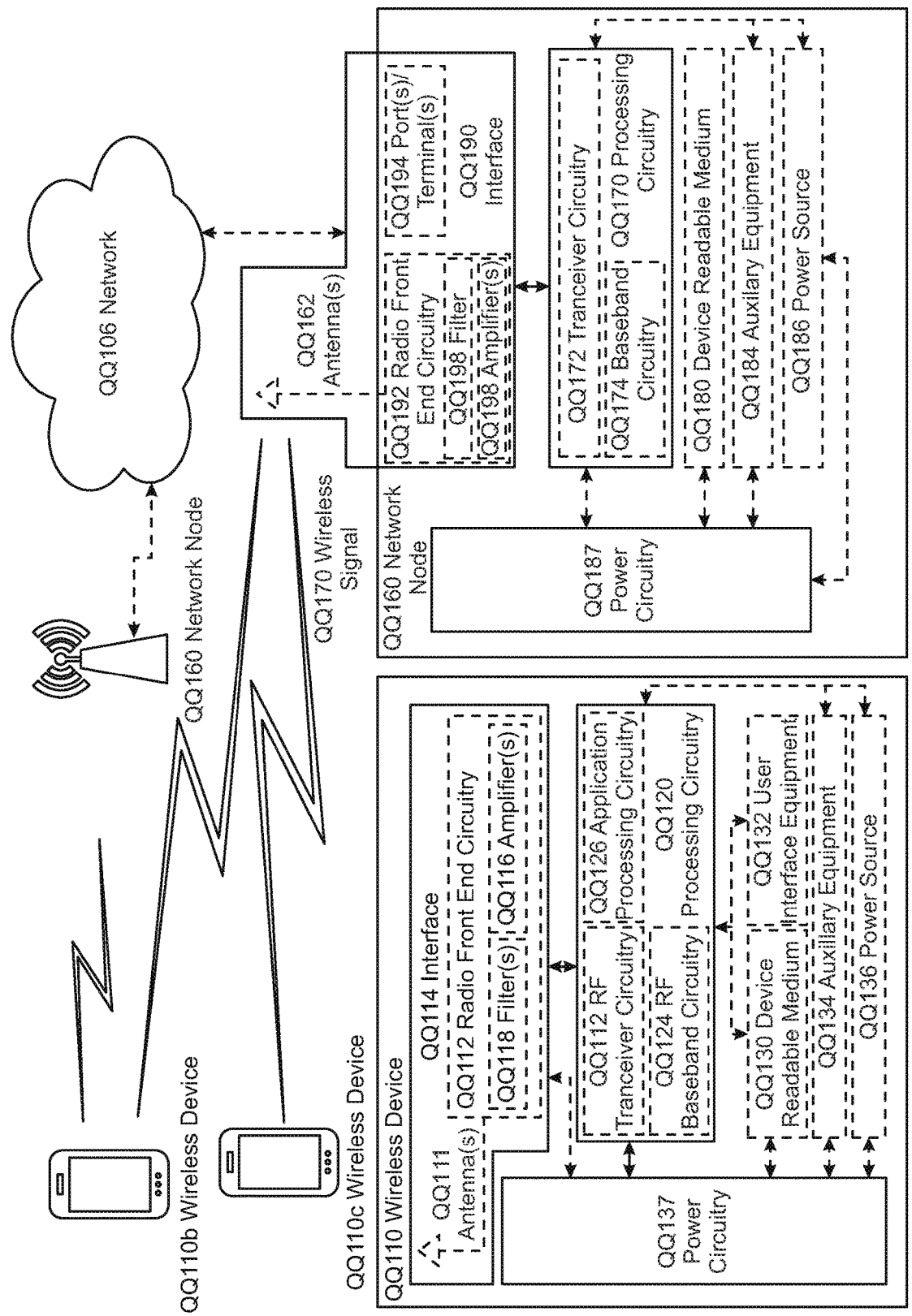
FIG. 4: shows a NB-IoT or MTC network in accordance with some embodiments.

Although the subject matter described herein may be implemented in any appropriate type of system using any suitable components, the embodiments disclosed herein are described in relation to a narrowband internet of things network or a machine type communication network, such as the example wireless network illustrated in FIG. 4. For simplicity, the wireless network of FIG. 4 only depicts network QQ106, network nodes QQ160 and QQ160b, and wireless devices (also referred to as UEs) QQ110, QQ110b, and QQ110c. In practice, a wireless network may further include any additional elements suitable to support communication between UEs or between a wireless device and another communication device, such as a landline telephone, a service provider, or any other network node or end device. Of the illustrated components, network node QQ160 and UE (WD) QQ110 are depicted with additional detail. The wireless network may provide communication and other types of services to one or more UEs to facilitate the UEs' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or UE functionality, such as providing wireless connections in a wireless network. In different embodiments, the wireless network may comprise any number of wired or wireless networks, network nodes, base stations, controllers, UEs, relay stations, and/or any other components or systems that may facilitate or participate in the communication of data and/or signals whether via wired or wireless connections.

As used herein, network node refers to equipment capable, configured, arranged and/or operable to communicate directly or indirectly with a UE and/or with other network nodes or equipment in the wireless network to enable and/or provide wireless access to the UE and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., Mobile Switching Centers (MSC), Mobility Management Entities (MME), operation and maintenance (O&M) nodes, operations support system (OSS) nodes, self-organizing network (SON) nodes, positioning nodes (e.g., evolved Serving Mobile Location Centers (E-SMLC), and/or Minimization of drive tests (MDT) node. As another example, a network node may be a virtual network node as described in more detail below. More generally, however, network nodes may represent any suitable device (or group of devices) capable, configured, arranged, and/or operable to enable and/or provide a UE with access to the wireless network or to provide some service to a UE that has accessed the wireless network.

In FIG. 4, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a UE, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a UE, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 4 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, UE or wireless device (WD) refers to a device capable, configured, arranged and/or operable to communicate wirelessly with network nodes and/or other wireless devices. Unless otherwise noted, the term user equipment (UE) may be used interchangeably herein with the term WD. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, UE QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc.

The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 5:
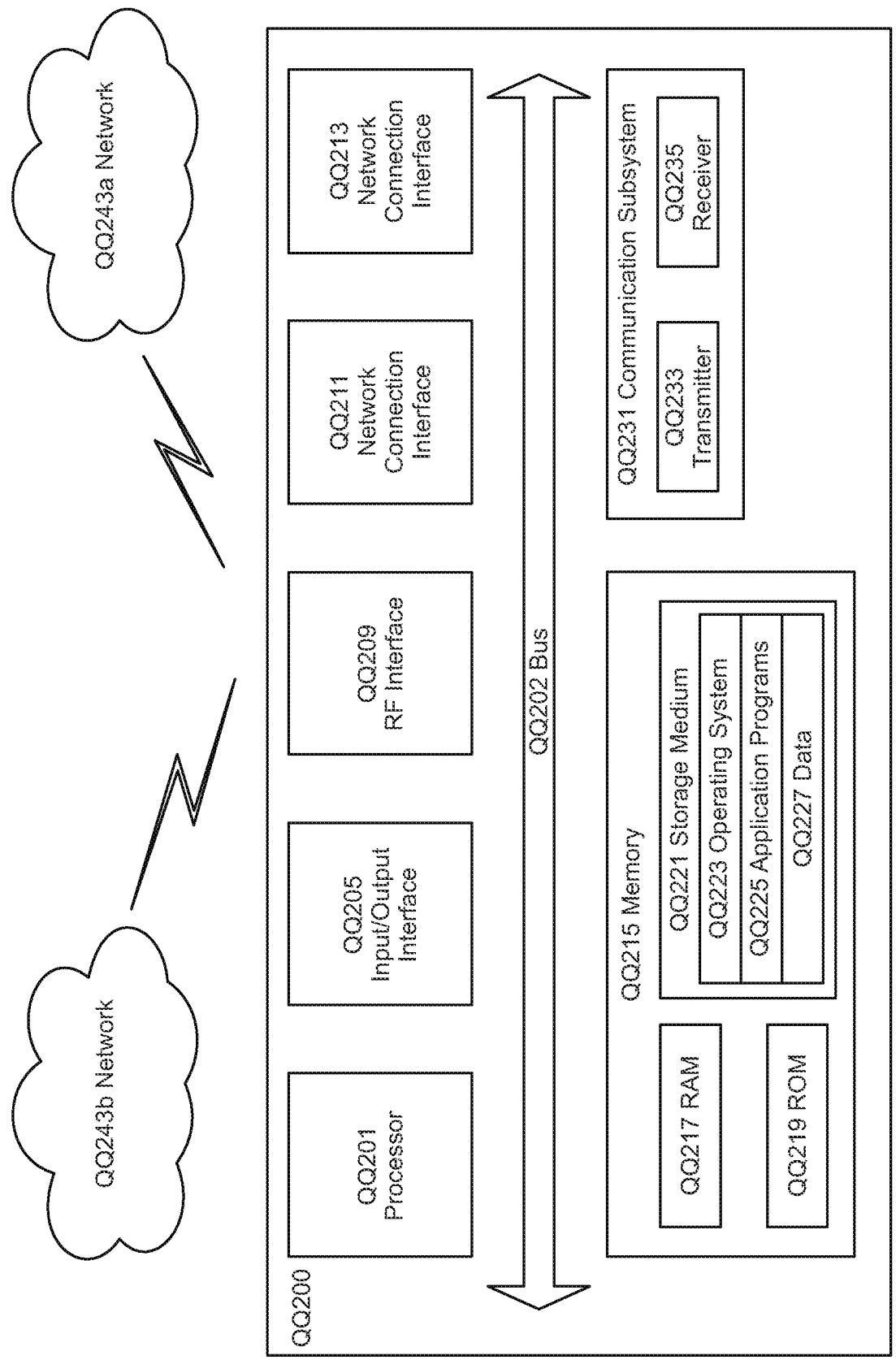
FIG. 5: shows a User Equipment in accordance with some embodiments.

FIG. 5 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the $3^{rd}$ Generation Partnership Project (3GPP), including a NB-IoT UE, a machine type communication (MTC) UE, and/or an enhanced MTC (eMTC) UE. UE QQ200, as illustrated in FIG. 5, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 5 is a UE, the components discussed herein are equally applicable to a WD, and vice-versa.

In FIG. 5, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in Figure QQ2, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 5, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 6:
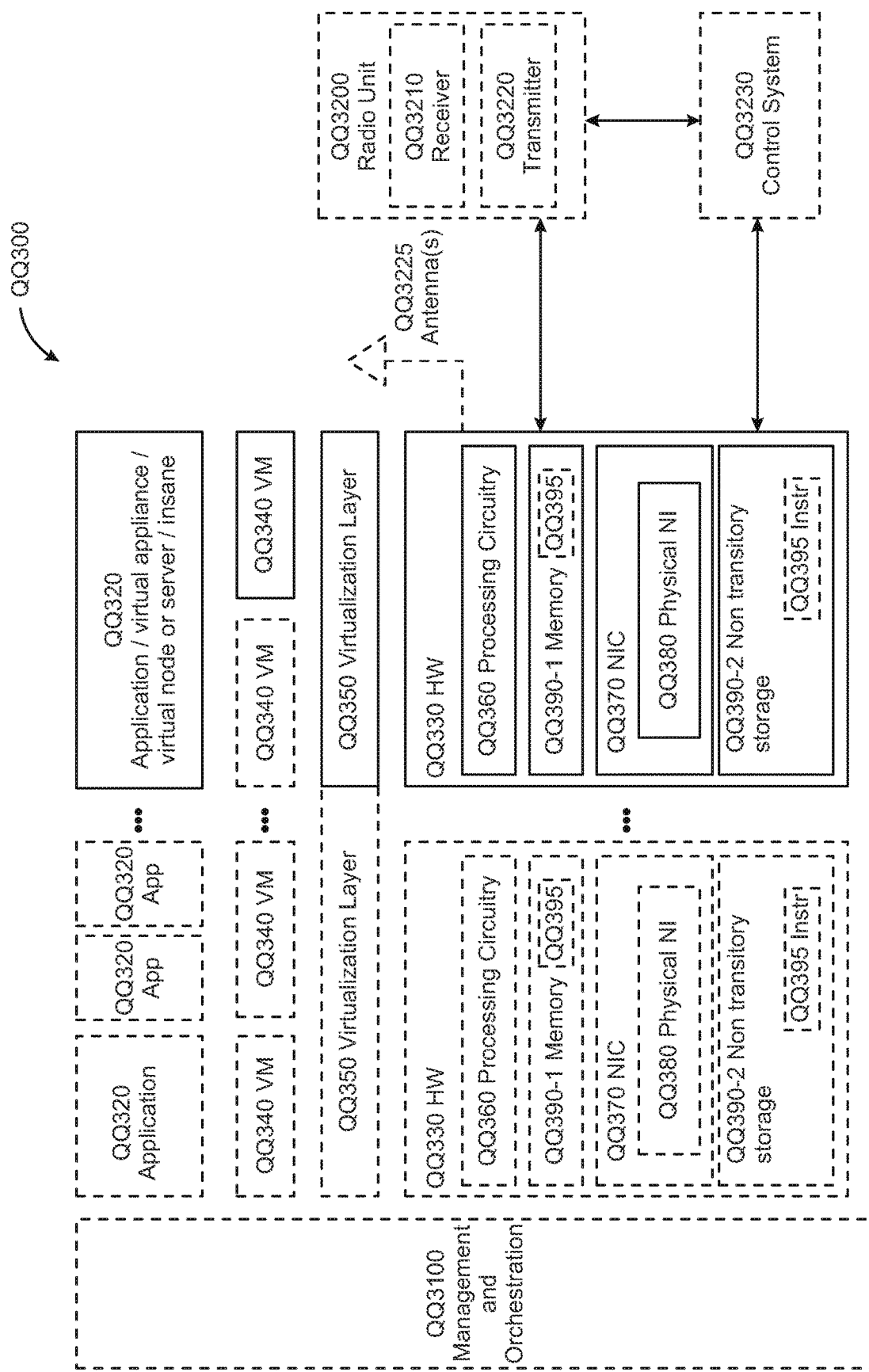
FIG. 6: shows a Virtualization environment in accordance with some embodiments.

FIG. 6 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 6, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 6.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be affected with the use of control system QQ3230 which may alternatively be used for communication between the hardware nodes QQ330 and radio units QQ3200.

Figure 7:
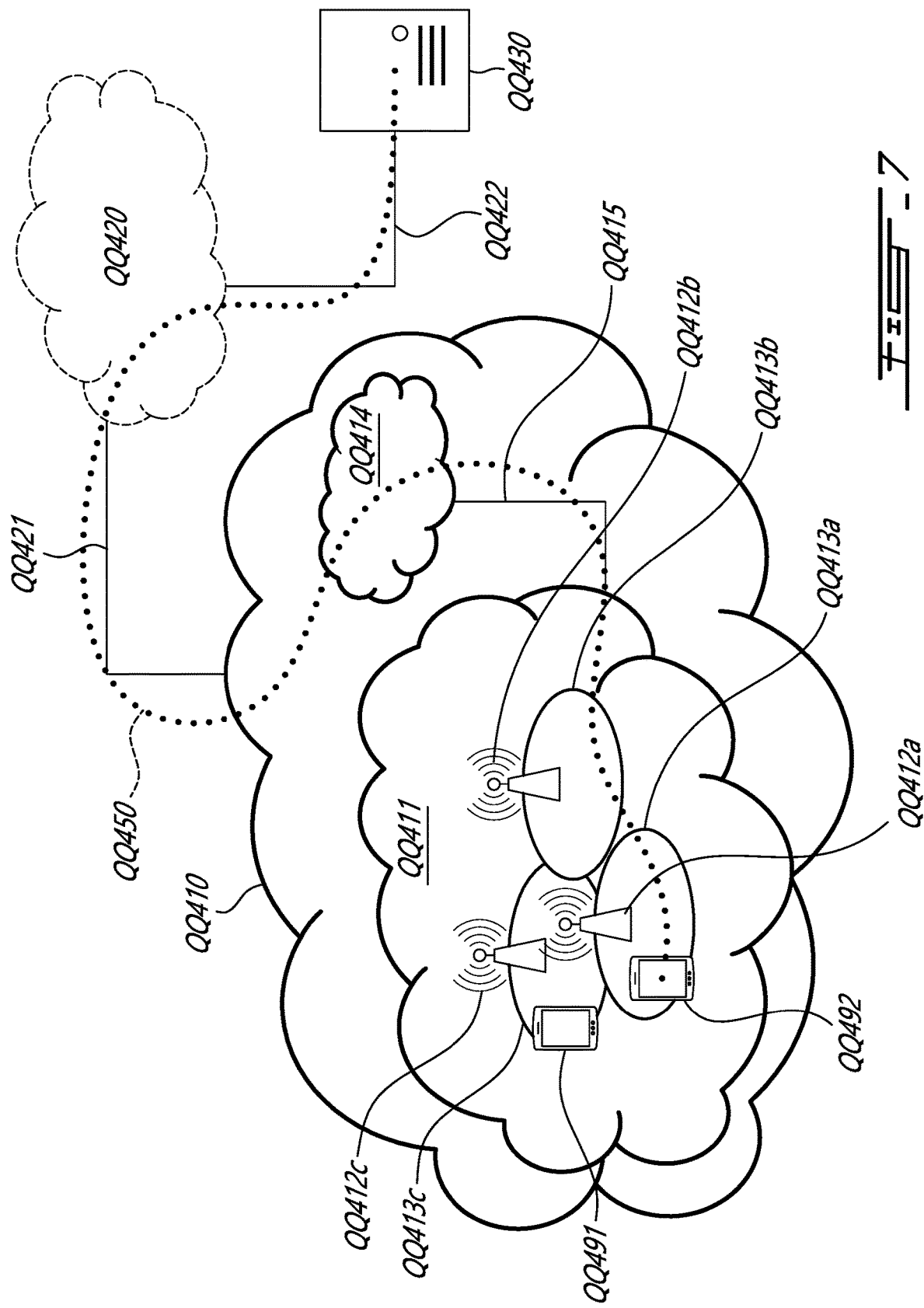
FIG. 7: shows a telecommunication network connected via an intermediate network to a host computer in accordance with some embodiments.

With reference to FIG. 7, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 7 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 8. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 8) served by base station QQ520. Communication interface QQ526 may be configured to facilitate connection QQ560 to host computer QQ510. Connection QQ560 may be direct or it may pass through a core network (not shown in FIG. 8) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 8:
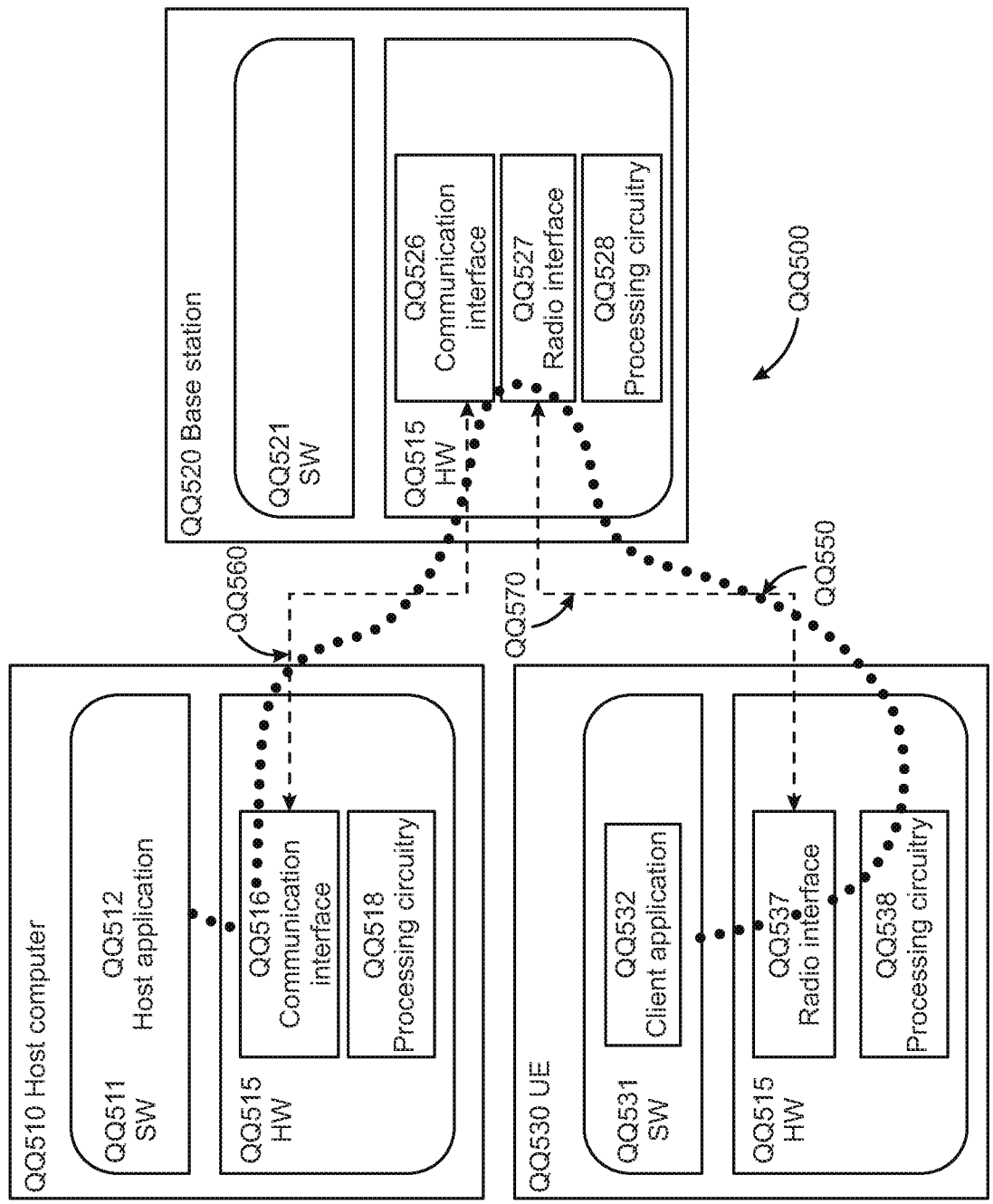
FIG. 8 shows a host computer communicating via a base station with a user equipment over a partially wireless connection in accordance with some embodiments.

It is noted that host computer QQ510, base station QQ520 and UE QQ530 illustrated in FIG. 8 may be similar or identical to host computer QQ430, one of base stations QQ412a, QQ412b, QQ412c and one of UEs QQ491, QQ492 of FIG. 7, respectively. This is to say, the inner workings of these entities may be as shown in FIG. 8 and independently, the surrounding network topology may be that of FIG. 7.

In FIG. 8, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the power consumption since only retrieving updated SI when necessary and thereby provide benefits such as responsiveness and extended battery life.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 9:
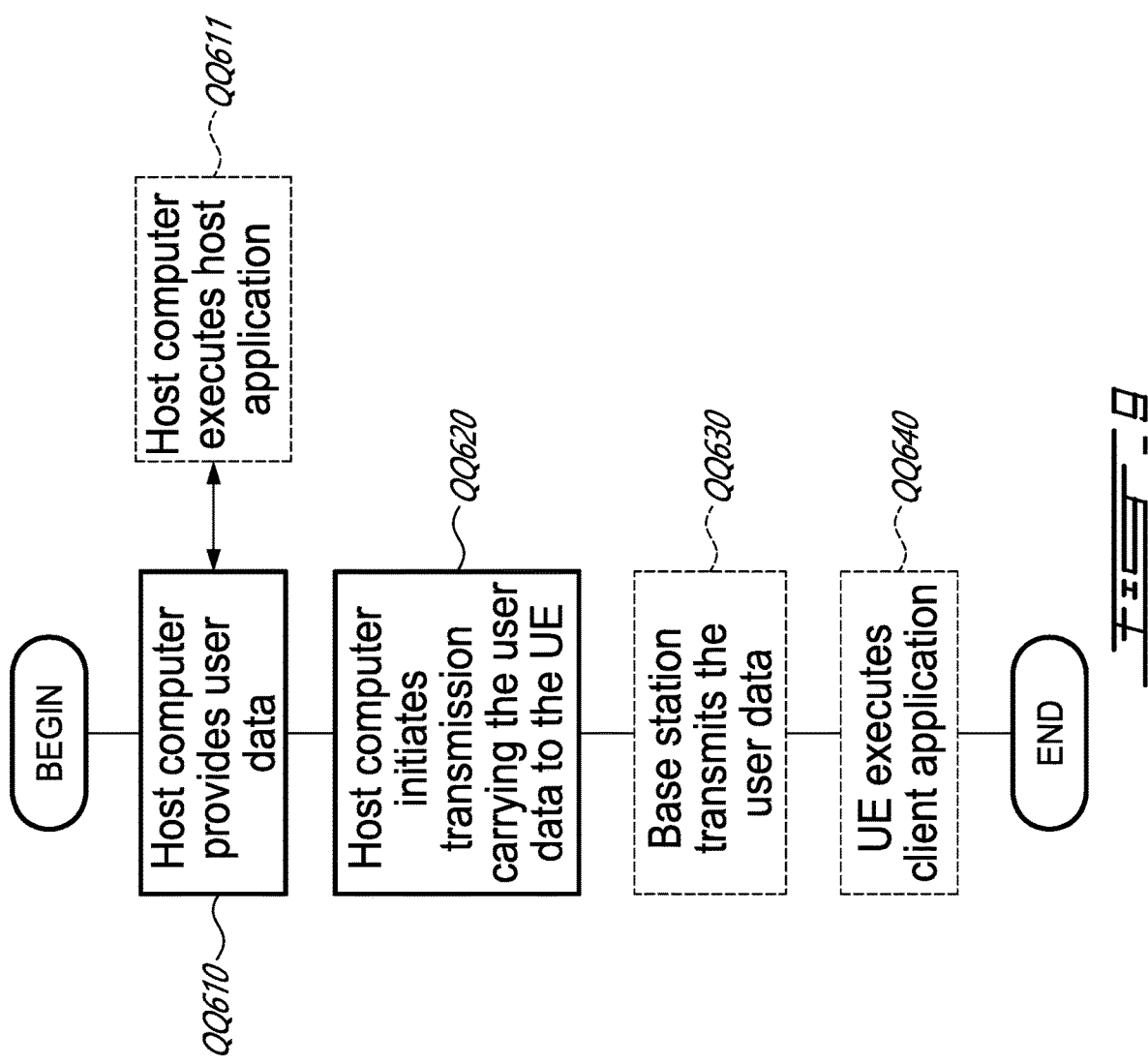
FIG. 9 shows methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 9 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 10:
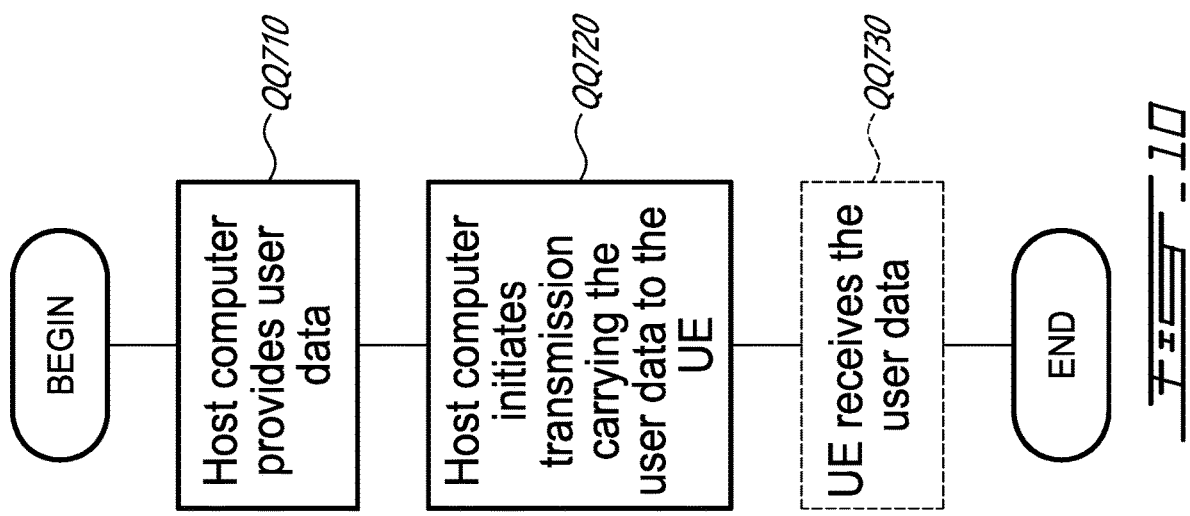
FIG. 10 shows methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 13:
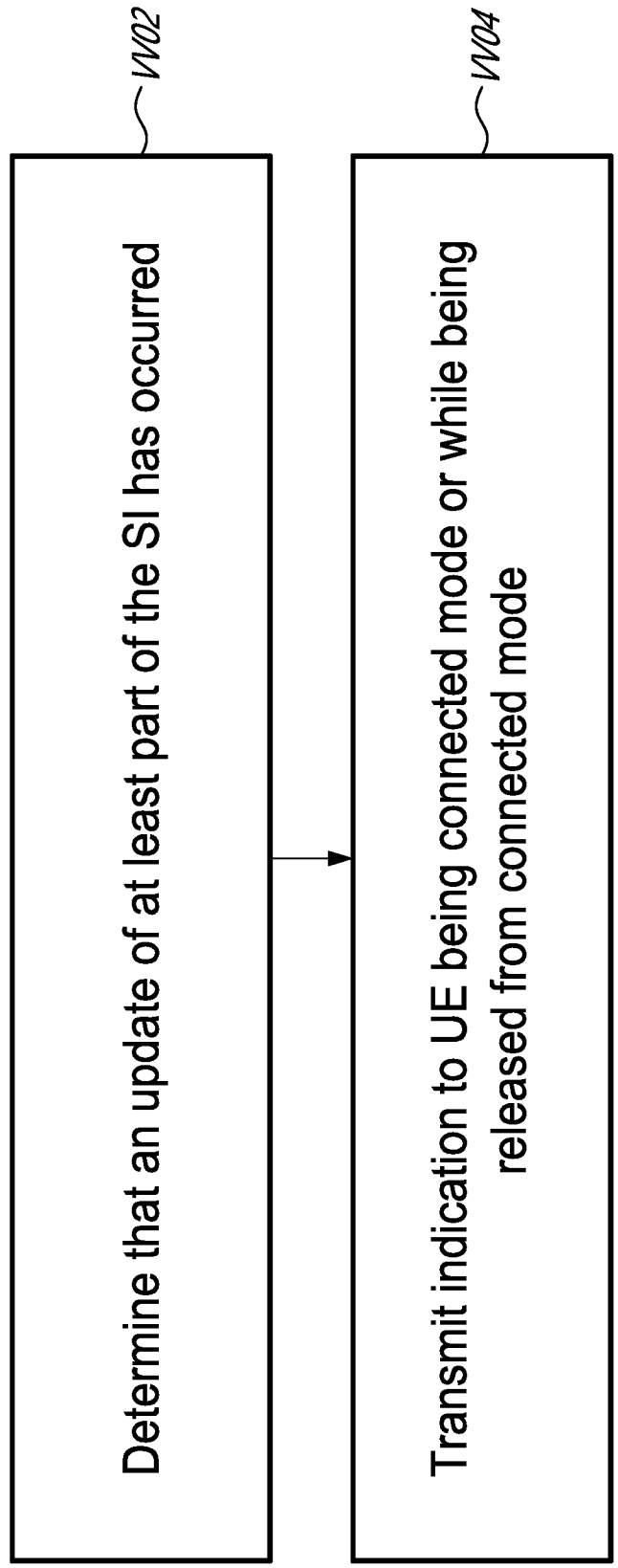
FIG. 13 shows a method in accordance with some embodiments.

FIG. 13 depicts a method in accordance with particular embodiments, the method begins at action VV02 with the network node, optionally, determines that an update of at least part of the SI for the service area of the network node has occurred or determines to update the at least part of SI.

Action W03. The network node transmits the indication to the UE being in connected mode or being released from the connected mode, which indication indicate the update of the at least part of SI or whether an update of at least part of the SI has occurred.

Figure 14:
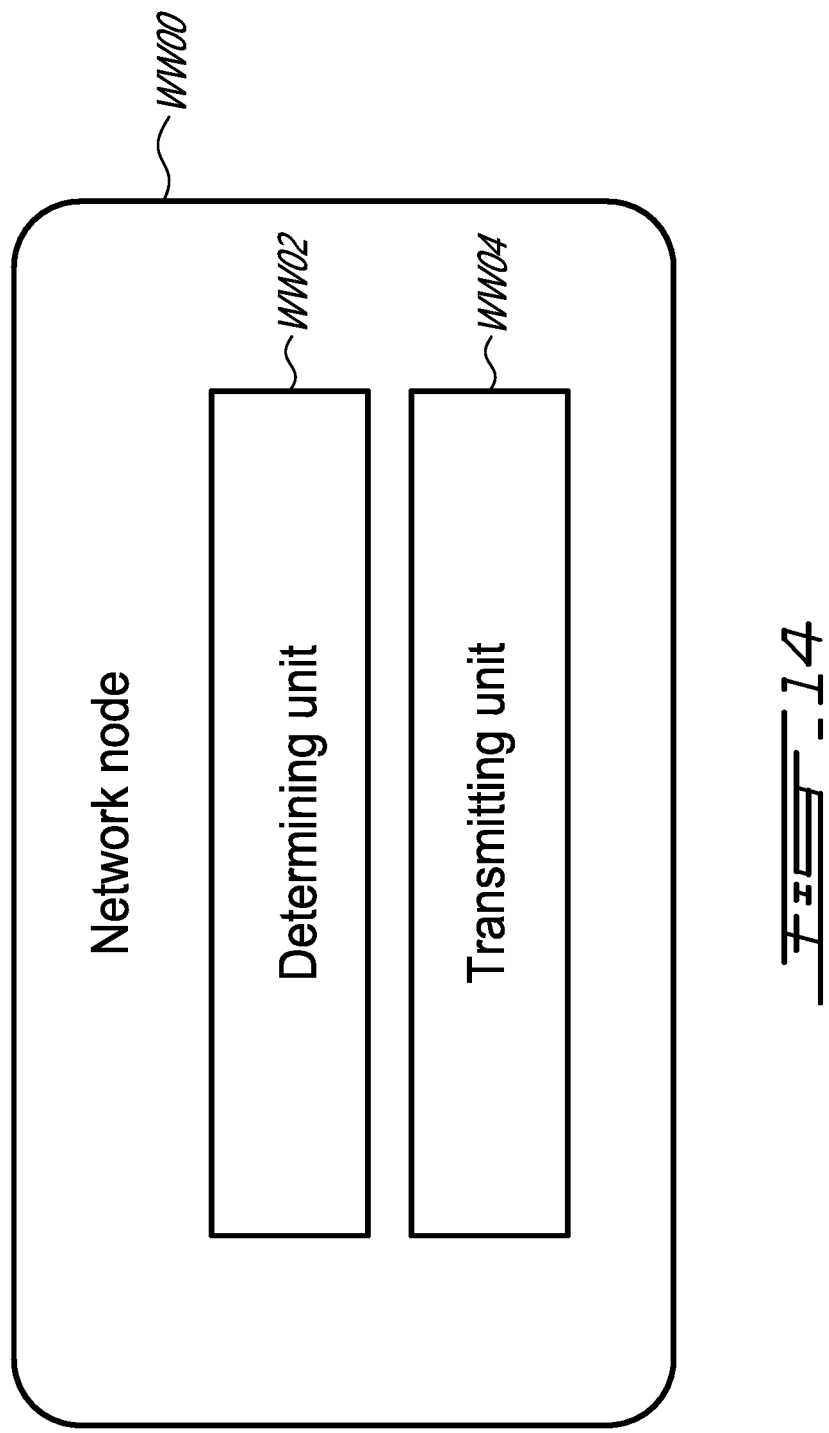
FIG. 14 shows a virtualization according to embodiments herein.

FIG. 14 illustrates a schematic block diagram of an apparatus WW00 in a wireless network (for example, the wireless network shown in FIG. 4). The apparatus may be implemented in a network node (e.g., network node QQ160 shown in FIG. 4). Apparatus WW00 is operable to carry out the example method described with reference to FIG. 13 and possibly any other processes or methods disclosed herein. It is also to be understood that the method of FIG. 13 is not necessarily carried out solely by apparatus WW00. At least some operations of the method can be performed by one or more other entities.

Virtual Apparatus WW00 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause a determining unit WW02, a transmitting unit WW04 (such as a transmitter or transceiver), and any other suitable units of apparatus WW00 to perform corresponding functions according one or more embodiments of the present disclosure.

As illustrated in FIG. 14, apparatus WW00 may include the determining unit WW02 and the transmitting unit WW04. The network node, the processing circuitry and/or the determining unit WW02 may be configured to determine to update the at least part of the SI for the service area of the narrowband internet of things network or the machine type communication network or that an update of the at least part of the SI has occurred or not while the UE has been connected, e.g. determine that an update of at least part of the SI for the service area of the network node has occurred or determines to update the at least part of SI. The network node, the processing circuitry and/or the transmitting unit WW04 is configured to transmit the indication to the UE being in connected mode or being released from the connected mode, which indication indicates the update of the at least part of SI of the service area of the narrowband internet of things network or the machine type communication network or whether an update of at least part of the SI has occurred. The indication may: indicate what SI has been updated, is provided part of the SI that has changed, or indicate whether an update of the at least part of the SI has occurred or not. The indication may be transmitted to inform the UE upon being released from connected mode to idle mode about whether the at least part of the SI has been updated or not during the connected mode.

Figure 15:
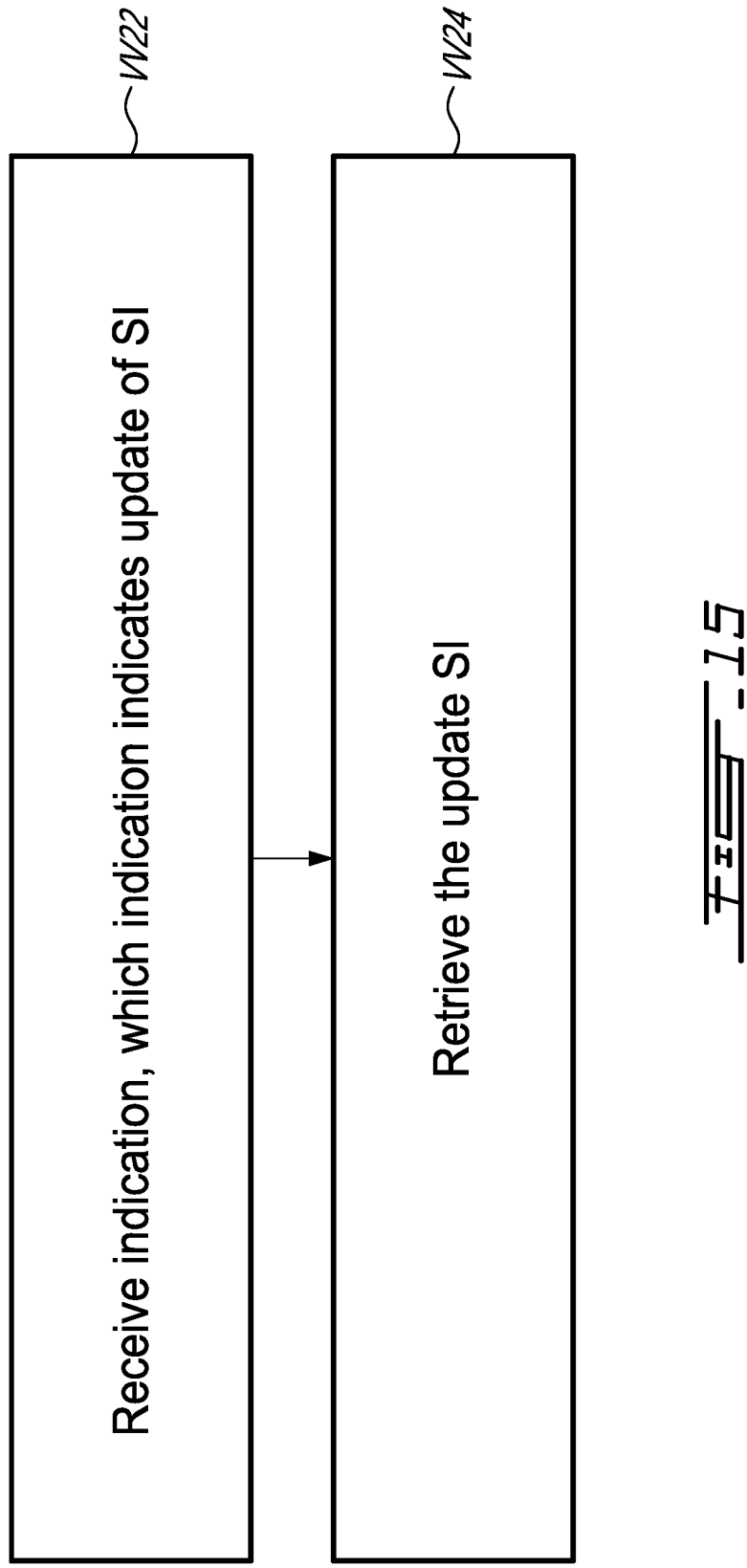
FIG. 15 shows a method in accordance with some embodiments.

FIG. 15 depicts a method in accordance with particular embodiments, the method begins at action VV22 with the UE, being in the connected mode or being released from the connected mode, receives the indication from the network node, which indication indicate the update of the at least part of SI, e.g. whether an update of at least part of the SI has occurred. Action VV24. The UE may then retrieve the updated at least part of the SI.

Figure 16:
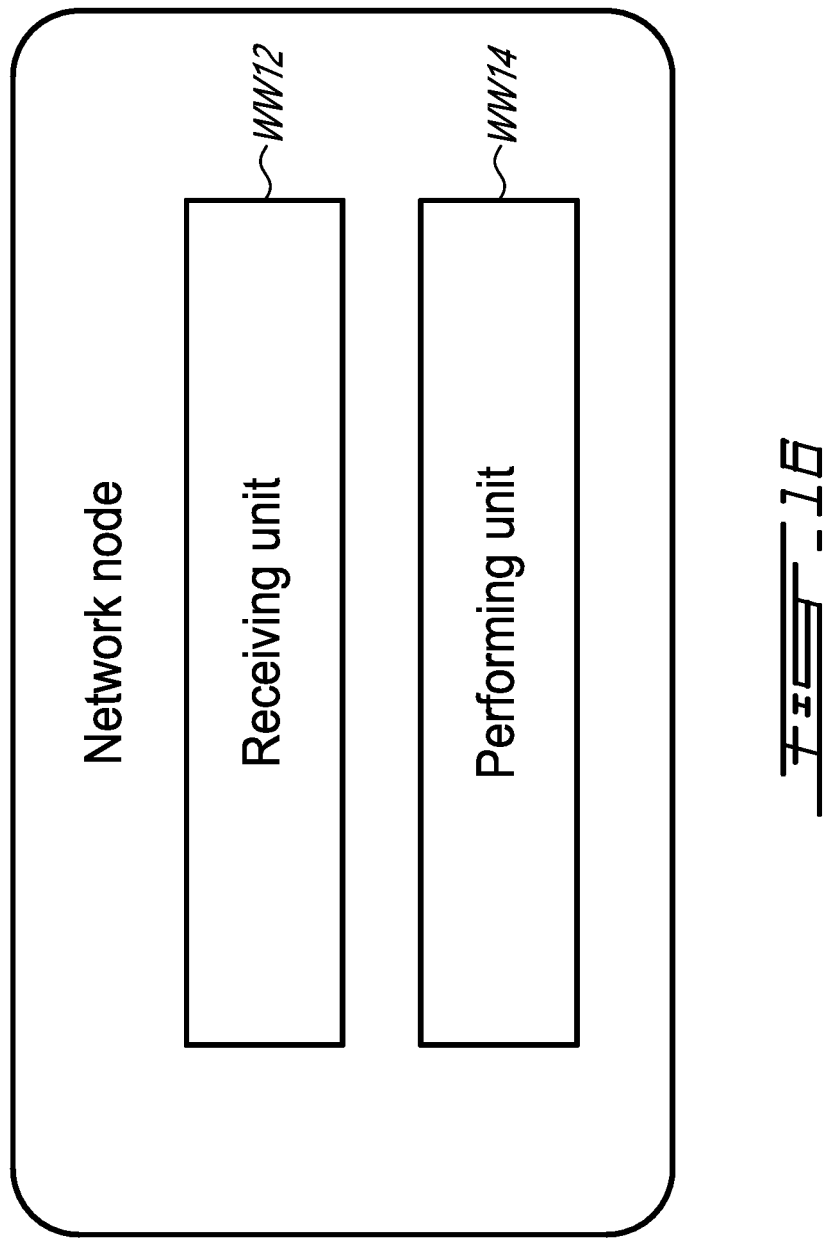
FIG. 16 shows a virtualization according to embodiments herein.

FIG. 16 illustrates a schematic block diagram of an apparatus WW20 in a wireless network (for example, the wireless network shown in FIG. 4). The apparatus may be implemented in a UE or UE (e.g., UE QQ110 shown in FIG. 4). Apparatus WW20 is operable to carry out the example method described with reference to FIG. 15 and possibly any other processes or methods disclosed herein. It is also to be understood that the method of FIG. 15 is not necessarily carried out solely by apparatus WW20. At least some operations of the method can be performed by one or more other entities.

Virtual Apparatus WW20 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause a receiving unit WW22 such as a receiver or transceiver, a retrieving unit WW24 and any other suitable units of apparatus WW20 to perform corresponding functions according one or more embodiments of the present disclosure.

As illustrated in FIG. 16, apparatus WW20, such as the UE QQ110 for handling communication in the narrowband internet of things network or the machine type communication network, wherein the UE QQ110 is in a connected mode or during a release of the UE QQ110 from the connected mode, includes the receiving unit and may include the retrieving unit WW24. The UE, the processing circuitry and/or the receiving unit WW22 is configured to receive the indication from the network node QQ160, wherein the indication indicates the update of the at least part of SI of the service area in the narrowband internet of things network or the machine type communication network. The indication may indicate what SI has been updated, may be provided part of the SI that has changed, or may indicate whether an update of the at least part of the SI has occurred or not. The indication may be received at the UE during a release of the UE QQ110 from the connected mode to idle mode, and wherein the indication indicates whether the at least part of the SI has been updated or not during the connected mode. The UE, the processing circuitry and/or the retrieving unit WW24 may be configured to, when indication indicates what SI has been updated or that the update has occurred, retrieve the updated at least part of the SI. The UE, the processing circuitry and/or the retrieving unit WW24 may be configured to, when the indication indicates that the at least part of the SI has been updated, retrieve the updated at least part of the SI in idle mode. The receiving unit WW22 may be configured to receive the indication from the network node, which indication indicates the update of the at least part of SI or e.g. whether an update of at least part of the SI has occurred. The retrieving unit may be configured to retrieve the at least part of the SI that has been updated.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).

3GPP 3$^{rd}$ Generation Partnership Project
BCCH Broadcast Control Channel
BI Backoff Indicator
BL Bandwidth Limited
BR Bandwidth Reduced
BSR Buffer Status Report
Cat-M1 Category M1
Cat-M2 Category M2
CE Coverage Enhanced/Enhancement
DL Downlink
(e)DRX (Extended) Discontinuous Reception
eMTC enhanced Machine-Type Communications
eNB Evolved NodeB
IoT Internet of Things
LTE Long-Term Evolution
MAC Medium Access Control
NAS Non-Access Stratum
NB-IoT Narrowband Internet of Things
M2M Machine-to-Machine MIB Master Information Block
MME Mobility Management Entity
MTC Machine-Type Communications
NB Narrowband
(M/N)PDCCH (MTC/Narrowband) Physical Downlink Control Channel
PDU Protocol Data Unit
(N)PRACH (Narrowband) Physical Random Access Channel
PRB Physical Resource Block
PSM Power Saving Mode
PSS Primary Synchronization Signal
RA Random Access
RAPID Random Access Preamble IDentifier
RAR Random Access Response
RNTI Radio Network Temporary Identifier
RRC Radio Resource Control (protocol)
SI System Information
SIB System Information Block
SSS Secondary Synchronization Signal
TBS Transport Block Size
UE User Equipment
UL Uplink
WI Work Item

The invention claimed is:

1. A method performed by a network node for handling communication in a narrowband internet of things (NB-IOT) network, the method comprising:
   determining to update at least a part of system information (SI) for a service area of the NB-IoT network or the update of the at least part of the SI has occurred or not while a user equipment (UE) is in a connected mode; and
   transmitting an indication to the UE when the UE is released from the connected mode to an idle mode,
   wherein the indication indicates what SI has been updated, is the provided part of the SI that has changed, and indicates whether an update of the at least part of the SI has occurred or not.

2. The method according to claim 1, wherein the indication is transmitted to inform the UE whether the at least part of the SI has been updated or not during the connected mode.

3. A method performed by a user equipment (UE) for handling communication in a narrowband internet of things (NB-IoT) network, wherein the UE is in a connected mode or during a release of the UE from the connected mode, the method comprising:
   receiving an indication from a network node, wherein the indication is received at the UE when the UE is released from the connected mode to an idle mode, and the indication indicates one or more of:
     an update of at least a part of a system information (SI) of a service area in the NB-IoT network; and
     the update of the at least part of the SI has occurred or not while the UE is in the connected mode,
       wherein the indication indicates what SI has been updated, is the provided part of the SI that has changed, and indicates whether an update of the at least part of the SI has occurred or not.

4. The method according to claim 3, further comprising, when the indication indicates what SI has been updated or that the update has occurred, retrieving the updated at least part of the SI.

5. The method according to claim 3, wherein the indication indicates whether the at least part of the SI has been updated or not during the connected mode.

6. The method according to claim 5, wherein the indication indicates that the at least part of the SI has been updated, the method further comprising retrieving the updated at least part of the SI in the idle mode.

7. A network node for handling communication in a (NB-IoT) network, wherein the network node is configured to:
   determine to update at least a part of system information (SI) for a service area of the NB-IoT network or the update of the at least part of the SI has occurred or not while a user equipment (UE) is in a connected mode; and
   transmit an indication to the UE when the UE is released from the connected mode to an idle mode,
   wherein the indication indicates what SI has been updated, is the provided part of the SI that has changed, and indicates whether an update of the at least part of the SI has occurred or not.

8. The network node according to claim 7, wherein the indication is transmitted to inform the UE whether the at least part of the SI has been updated or not during the connected mode.

9. A user equipment (UE) for handling communication in a NB-IoT network, wherein the UE is in a connected mode or during a release of the UE from the connected mode, and wherein the UE is configured to:
   receive an indication from a network node, wherein
   the indication is received at the UE when the UE is released from the connected mode to an idle mode, and the indication indicates one or more of:
     an update of at least a part of a system information (SI) of a service area in the NB-IoT network; and
     the update of the at least part of the SI has occurred or not while the UE is in the connected mode,
       wherein the indication indicates what SI has been updated, is the provided part of the SI that has changed, and indicates whether an update of the at least part of the SI has occurred or not.

10. The UE according to claim 9, wherein the UE is further configured to, when the indication indicates what SI has been updated or that the update has occurred, retrieve the updated at least part of the SI.

11. The UE according to claim 9, wherein the indication indicates whether the at least part of the SI has been updated or not during the connected mode.

12. The UE according to claim 11, wherein the UE is configured to when the indication indicates that the at least part of the SI has been updated, retrieve the updated at least part of the SI in the idle mode.

* * * * *